United States Patent [19]
Tokoro

[11] Patent Number: 5,481,520
[45] Date of Patent: Jan. 2, 1996

[54] DISK PLAYER DOOR ASSEMBLY

[75] Inventor: Koichi Tokoro, Ueda, Japan

[73] Assignee: Shinano Kenshi Kabushiki Kaisha, Nagano, Japan

[21] Appl. No.: 178,404

[22] Filed: Jan. 6, 1994

[51] Int. Cl.⁶ .................................. G11B 33/02
[52] U.S. Cl. .................. 369/77.2; 369/75.1; 360/99.06
[58] Field of Search ................. 369/77.1, 77.2, 369/75.1, 75.2; 360/99.02, 99.06, 86

[56] References Cited

U.S. PATENT DOCUMENTS

| | | | |
|---|---|---|---|
| 4,146,912 | 3/1979 | Kukreja | 369/77.2 |
| 4,419,703 | 12/1983 | Gruczelak et al. | 360/99.06 |
| 4,504,879 | 3/1985 | Toldi et al. | 360/99.06 |
| 5,220,552 | 6/1993 | Yokoi et al. | 369/77.2 |
| 5,255,256 | 10/1993 | Engler et al. | 369/77.2 |

FOREIGN PATENT DOCUMENTS

| | | | |
|---|---|---|---|
| 63-78392 | 4/1988 | Japan | 369/77.1 |
| 1-13283 | 1/1989 | Japan | 369/77.1 |

Primary Examiner—Stuart S. Levy
Assistant Examiner—William R. Korzuch
Attorney, Agent, or Firm—Birch, Stewart, Kolasch & Birch

[57] ABSTRACT

A disk player, which is capable of making a casing smaller and preventing dust from entering into the casing. The disk player includes a casing having an opening section, through which a disk cartridge is inserted and taken out, in a front face; a door member being pivotably attached ho the casing, the door member being capable of rotating outside of the casing between a first position, at which the door member closes the opening section of the casing, and a second position, at which the door member opens the same; and an elastic member for biasing the door member toward the first position.

2 Claims, 4 Drawing Sheets

DISK PLAYER DOOR ASSEMBLY

BACKGROUND OF THE INVENTION

1. Field of the Invention

The present invention relates to a disk player, more precisely relates to a disk player comprising a casing having an opening section, through which a disk cartridge is inserted and taken out, and a door member for opening and closing the opening section of the casing.

2. Description of the Prior Art

Conventionally, disk players in which disk cartridges are inserted are used. The disk cartridges are capable of accommodating recorded disks, e.g., compact disks, to be played by the disk players. When the disk cartridge accommodating the disks is inserted in a casing of the disk player, a cartridge shell accommodating the disk cartridge descends to set. The disks in the disk cartridge are rotated by a spindle motor, and data recorded on the disks are read by an optical pick-up and played. In the conventional disk players, when the disk cartridge is set in the casing, a door member, which is provided to an opening section of the casing, is pushed to rotate inward by a front end of the disk cartridge. When the door member opens the opening section, the disk cartridge can be inserted into the casing through the opening section. When the cartridge shell descends together with the disk cartridge, the door member, which has been rotated inward, automatically rotates outward to close the opening section of the casing.

On the other hand, when the disk cartridge accommodating the disks is taken out from the casing, firstly the door member is rotated inward to open the opening section by a proper mechanism. Successively, the cartridge shell ascends together with the disk cartridge, then the disk cartridge is discharged outside through the opening section of the casing.

However, conventional disk players have a following disadvantage.

The door member must be rotated in the casing when the disk cartridge is inserted in and taken out from the casing. Therefore, a space for avoiding an interference between the door member and the cartridge shell with the disk cartridge must be formed in the casing, so that the casing must be larger.

To solve the disadvantage, a disk player, whose door member is rotated outward to open the opening section while the disk cartridge is in the casing, is proposed. But dust enters into the casing through the opening section, which has been opened, and it causes some trouble.

SUMMARY OF THE INVENTION

An object of the invention is to provide a disk player, which is capable of making a casing smaller and preventing dust from entering into the casing.

To achieve the object, the disk player of the present invention comprises:

a casing having an opening section, through which a disk cartridge is inserted and taken out, in a front face;

a door member being pivotably attached to the casing, the door member being capable of rotating outside of the casing between a first position, at which the door member closes the opening section of the casing, and a second position, at which the door member opens the same; and means for biasing the door member toward the first position.

In the disk player of the present invention, since the door member is capable of rotating outside of the casing, no space for avoiding the interference between the door member and the cartridge shell, etc. is needed. Thus, the casing of the disk player can be made smaller.

Furthermore, the door member is automatically rotated to close the opening section by the biasing means after the disk cartridge is inserted into the casing, so that the opening section of the casing is always closed by the door member except while the disk cartridge is inserted and taken out, so that dust can be effectively prevented from entering.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings, in which.

DETAILED DESCRIPTION OF PREFERRED EMBODIMENTS

Preferred embodiments of the present invention will now be described in detail with reference to the accompanying drawings.

Figure 1:
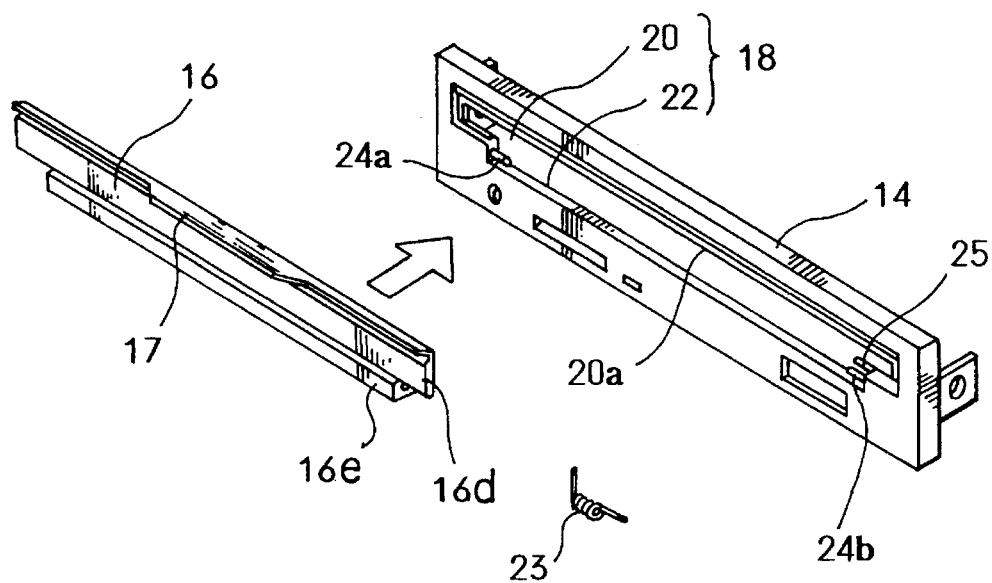
FIG. 1 is an exploded perspective view of a front panel and a door member of a disk player of an embodiment.
Figure 2:
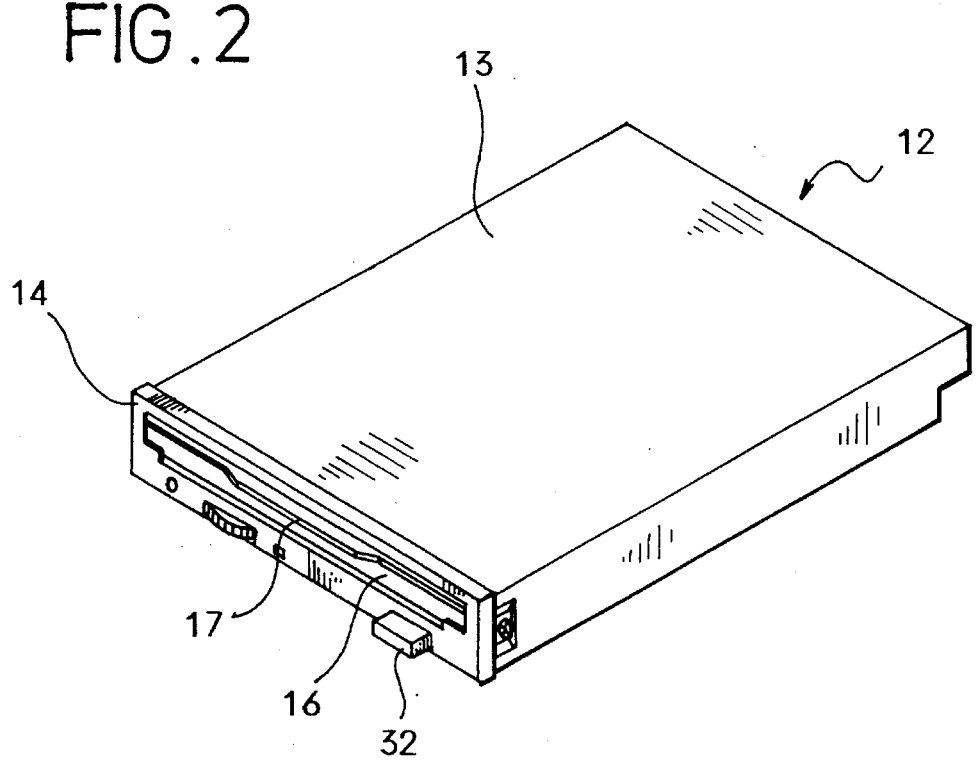
FIG. 2 is a perspective view of the disk player.

FIG. 1 is an exploded perspective view of a front panel and a door member of a disk player of the embodiment; FIG. 2 is a perspective view of the disk player.

There is provided a front panel 14 on a front face of the casing 13 of the disk player 12. A door member 16 is provided in the front panel 14.

There is bored a large opening section 18 in a center part of the front panel 14. The opening section 18 has an insert-mouth 20, through which a disk cartridge accommodating compact disks, which are an example of disks, is inserted, and a narrower hinge-mouth 22, in which the door member 16 is pivotably attached. There are extended a pair of shafts 24a and 24b inward from both ends of the hinge-mouth 22. The shaft 24b is slightly longer than the shaft 24a. There is formed a boss 25 with which one end section of a coil spring 23, which is an example of means for always biasing the door member 16 toward a first position at which the door member 16 fully closes the opening section 18, is engaged in the vicinity of the shaft 24b.

There is extended an inner flange 20a inward from edges of the insert-mouth 20 of the opening section 18. When the door member 16 closes the opening section 18, edges of the door member 16 contact an outer face of the inner flange 20a.

The door member 16 has a door section 16d, which is capable of closing the insert-mouth 20 of the opening section 18, and a hinge section 16e, which corresponds to the hinge-mouth 22. Details of the door member 16 will be explained with reference to FIGS. 4–7.

There is bent and extended an extended section 17 outward from a center part of an upper edge of the door section 16d of the door member 16.

Figure 7:
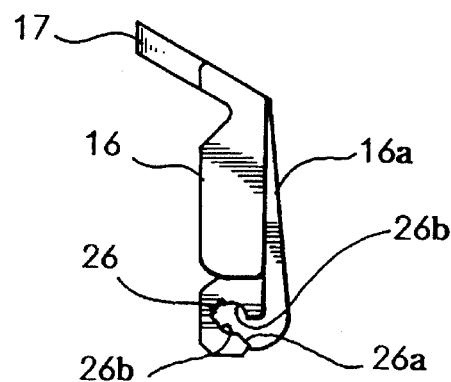
FIG. 7 is a side view thereof.

There are formed ribs 16a for guiding the movement of the disk cartridge on a rear face of the door member 16. And there are formed ribs 16b for reinforcing on outer sides of the ribs 16a (see FIG. 6). As shown in FIG. 7, thickness of lower ends of the ribs 16a is greater than that of upper ends thereof. On the other hand, thickness of lower ends of the ribs 16b is equal to that of upper ends thereof.

There are formed hinge pieces 26 at both ends of the hinge section 16e. Each hinge piece 26 has a slit 26a, which is diagonally formed as shown in FIG. 7. Namely, the slit 26a is formed non-parallel to an image line connecting a lower edge of the door member 16 with the upper edge thereof. There are formed large space sections 26b, in which the shafts 24a and 24b can be pivotably fitted, in each slit 26a. By fitting the shafts 24a and 24b in the large space sections 26b in the slits 26a of the hinge pieces 26, the door member 16 can be rotated about the shafts 24a and 24b with respect to the front panel 14. There is formed an engage section 16c, with which the other end 23b of the coil spring is engaged, in the vicinity of the hinge piece 26 for the shaft 24b.

Figure 3:
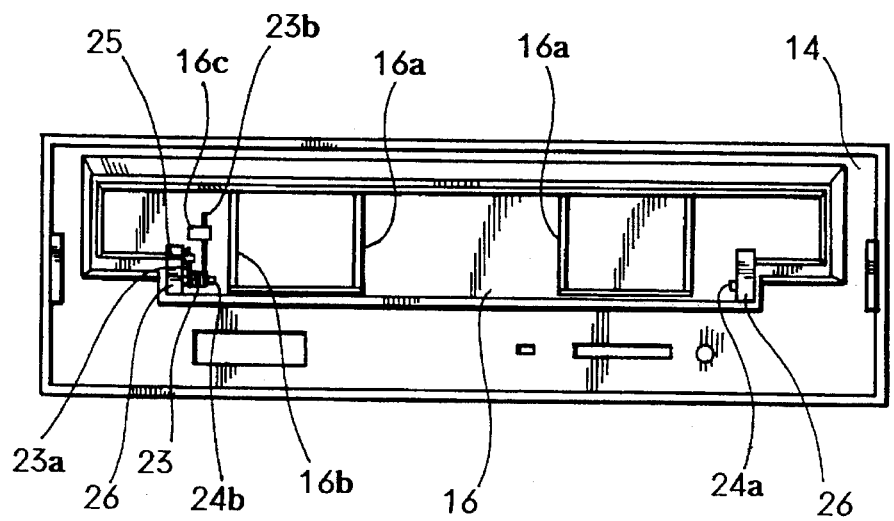
FIG. 3 is a rear view of the front panel.
Figure 4:
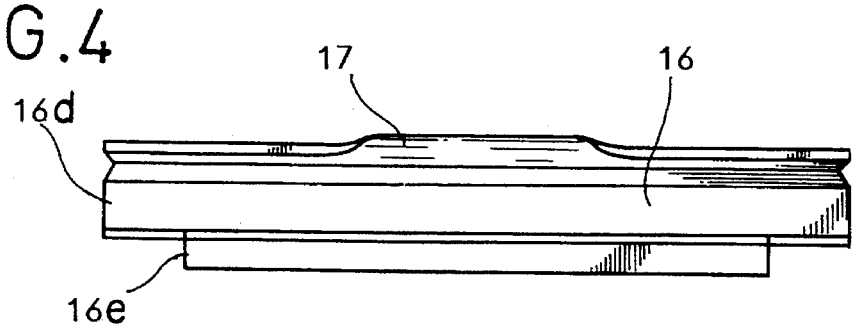
FIG. 4 is a front view of the door member.
Figure 5:
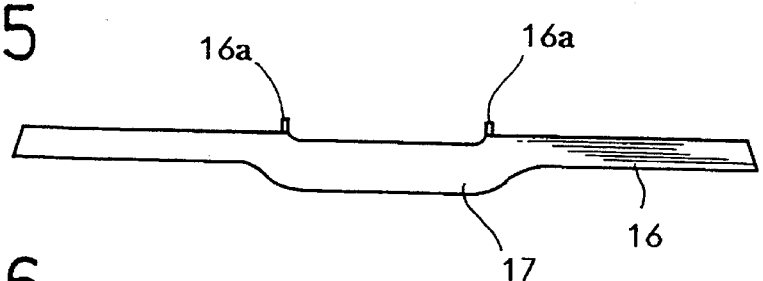
FIG. 5 is a plan view thereof.
Figure 6:
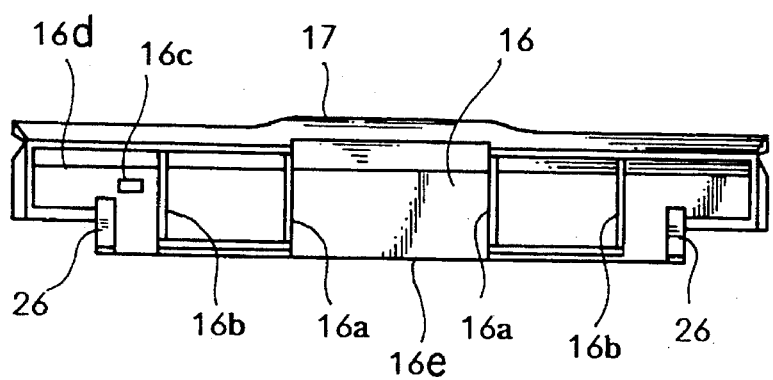
FIG. 6 is a rear view thereof.
Figure 8:
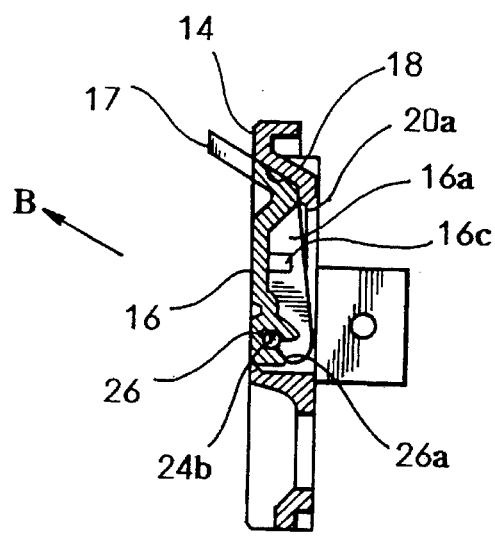
FIG. 8 is a sectional view of the front panel and the door member.

FIG. 3 is a rear view of the front panel 14 with the door member 16; and FIG. 8 is a sectional view the front panel 14 and the door member 16.

The slits 26a of the hinge pieces 26 of the door member 16 are pivotably fitted with the shafts 24a and 24b in the hinge-mouth 22 of the front panel 14. The coil spring 23 covers a front section of the longer shaft 24b. And the one end 23a of the coil spring 23 is engaged with the boss 25; the other end 23b is engaged with the engage section 16c. With this structure, the door member 16 is always biased toward the first position, at which the door member 16 closes the opening section 18, by the elasticity of the coil spring 23.

Figure 10:
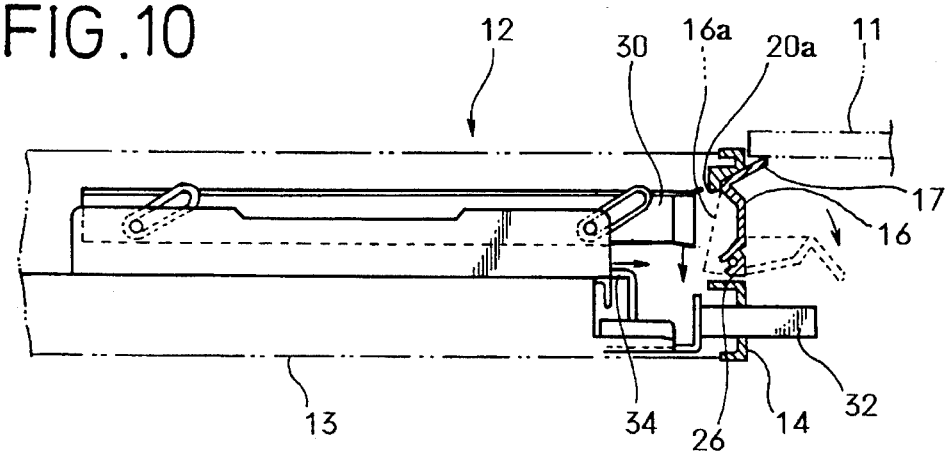
FIG. 10 is an explanation view of the disk player showing a state in which a disk cartridge can be inserted into a cartridge shell.
Figure 11:
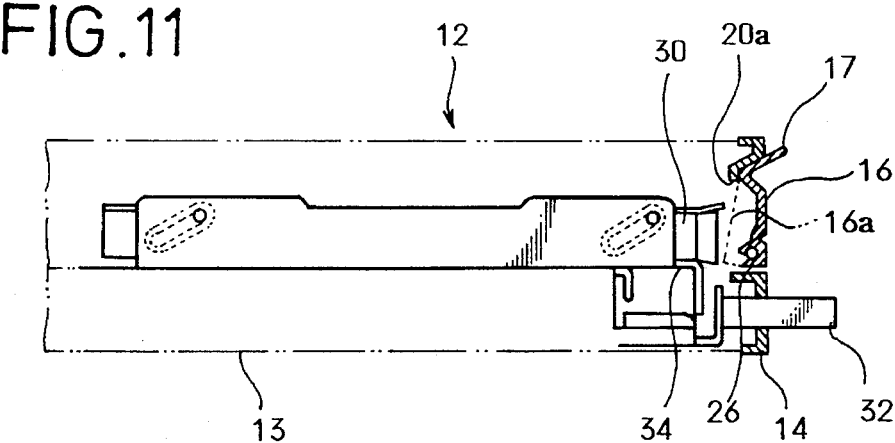
FIG. 11 is an explanation view of the disk player showing a state in which a disk cartridge is set.

There is provided a cartridge shell 30 in the casing 13 of the disk player 12 (see FIGS. 10 and 11). When the cartridge shell 30 is at an uppermost position which corresponds to the insert-mouth 20, the disk cartridge can be accommodated in the cartridge shell 30 through the insert-mouth 20. Upon accommodating the disk cartridge in the cartridge shell 30, the cartridge shell 30 descends to set. On the other hand, to eject the disk cartridge, which has been accommodated in the cartridge shell 30 and set, from the casing 13, an eject button 32 provided to the front panel 14 is pushed. Then the cartridge shell 30 ascends, and the disk cartridge is ejected from the casing 13 through the insert-mouth 20. Note that, when the disk cartridge is ejected through the insert-mouth 20, the disk cartridge pushes the ribs 16a against the elasticity of the coil spring 23 to rotate the door member 16 to the second position, so that the opening section 18 is fully opened.

When the disk cartridge is accommodated in the cartridge shell 30, an ejecting plate 34 is unlocked to move forward. By the action, the cartridge shell 30 descends to the set-position (see FIG. 11). On the other hand, when the eject button 32 is pushed, the ejecting plate 34 is moved backward, and the cartridge shell 30 ascends. Then the disk cartridge is ejected from the casing 13 (see FIG. 10). Above described actions are executed by a well known cartridge loading mechanism (not shown) and a cartridge ejecting mechanism (not shown).

Successively, actions of the disk player 12 will be explained.

Firstly, the disk cartridge 11 is set in the disk player 12. To set the disk cartridge 11, the front section of the disk cartridge 11 is mounted on the extended section 17 of the door member 16, which has been located at the first position, then the disk cartridge 11 is pushed down against the elasticity of the coil spring 23. By pushing down the disk cartridge 11, the door member 16 is rotated about the shafts 24a and 24b to the second position so as to fully open the opening section 18.

When the door member 16 at the second position fully opens the opening section 18, the disk cartridge 11 is accommodated in the cartridge shell 30 through the opening section 18. When the disk cartridge 11 is accommodated, the door member 16 is rotated to the first position by the elasticity of the coil spring 23 to close the opening section 18. Therefore, even in the state of accommodating the disk cartridge 11 in the casing 13, the opening section 18 of the casing 13 is fully closed, so that dust can be prevented from entering the casing 13.

To eject the disk cartridge 11 from the casing 13, the eject button 32 is pushed. Then the ejecting plate 34 is moved backward, and the cartridge shell 30 ascends, so that the disk cartridge 11 is ejected from the casing 13 through the opening section 18 by the ejecting mechanism. At that time, the disk cartridge 11 pushes the ribs 16a on the rear face of the door member 16 against the elasticity of the coil spring 23, so that the door member 16 is opened and the disk cartridge 11 can be ejected from the casing 13. If the disk cartridge 11 is taken out, the door member 16 is rotated to the first position to close the opening section 18 again.

Figure 9:
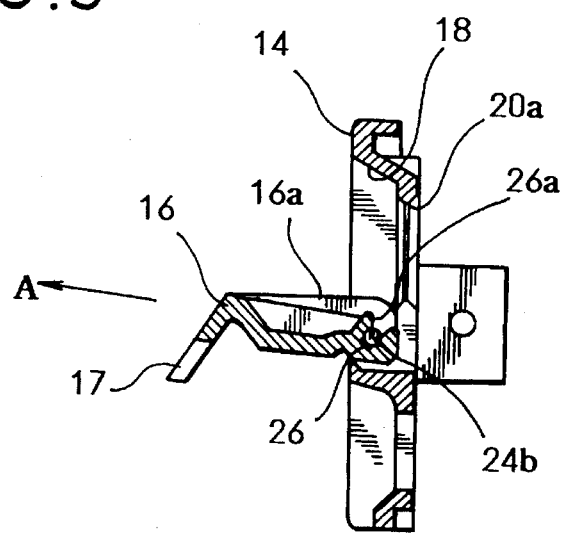
FIG. 9 is a sectional view thereof in which the door is located at a second position.

Note that, in the present embodiment, since the lower ends of the ribs 16a are wider than that of the upper ends thereof, inner edges of the ribs 16a can be in horizon when the door member 16 is located at the second position. The door member 16 at the second position is shown by solid lines in FIG. 9 and by dotted lines in FIG. 10. By the horizontal arrangement, the inner edges of the ribs 16a are capable of guiding the horizontal movement of the disk cartridge 11 ejected. The inner edges of the ribs 16a are also capable of guiding the horizontal movement of the disk cartridge 11 inserted into the casing 13. When the disk cartridge 11 is ejected, the door member 16 is pushed to open the opening section 18 by the disk cartridge 11. In this case, contact area between the disk cartridge 11 and the ribs 16a are quite small, so that frictional resistance therebetween can be reduced as much as possible.

In the present embodiment, the slit 26a is formed non-parallel to the image line connecting the lower edge of the door member 16 with the upper edge thereof. Even if the door member 16 located in the second position is pulled in the direction of an arrow A (see FIG. 9), the door member 16 cannot be detached from the shafts 24a and 24b.

Furthermore, in the case that the door member 16 is located in the first position as shown in FIG. 8, the door member 16 can be detached by pulling only in the direction of an arrow B. But the door member 16 cannot be pulled in the direction B by pulling the extended section 17. Thus, the door member 16 cannot be detached from the shafts 24a and 24b by merely pulling.

Figure 12:
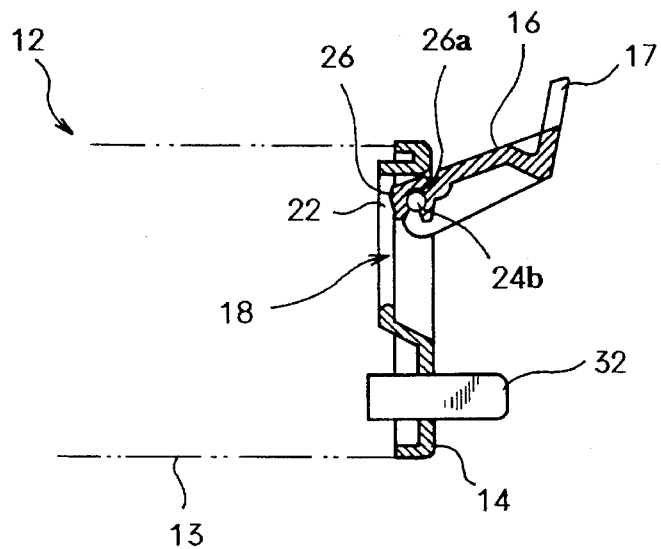
FIG. 12 is a sectional view of another embodiment of the door member.

In the foregoing embodiment, the hinge pieces 26 are provided at the lower section of the door member 16, but the hinge pieces 26 may be provided at the upper section of the door member 16. This embodiment is shown in FIG. 12. Note that, structural elements which have been described in the foregoing embodiment are assigned the same reference numerals.

In FIG. 12, the shafts 24a and 24b in the hinge-mouth 22 of the opening section 18 of the front panel 14 are pivotally fitted in the slits 26a of the hinge pieces 26 of the door member 16. There is provided the extended section 17 to the lower edge of the door member 16. Other structures are the same as the foregoing embodiment.

To set the disk cartridge 11 in the casing 13, the front section of the disk cartridge 11 is pushed on a lower face of the extended section 17 of the door member 16, which has been located at the first position, then the disk cartridge 11 is pushed upward against the elasticity of the coil spring 23. By pushing the disk cartridge 11 upward, the door member 16 is rotated about the shafts 24a and 24b to the second position so as to fully open the opening section 18. Thus, the disk cartridge 11 can be inserted into the casing 13 through the opening section 18.

On the other hand, to eject the disk cartridge 11 from the casing 13, the disk cartridge 11 which is ejected pushes the inner face of the door member 16 to rotate it upward, so that the opening section 18 is opened and the disk cartridge 11 is ejected therethrough.

The disk player 12 of the embodiment shown in FIG. 12 has the same effects.

Figure 13:
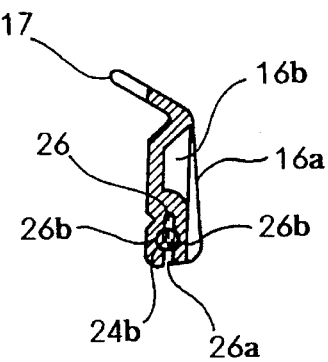
FIG. 13 is a sectional view of another embodiment of the door member.

In FIG. 13, a third embodiment is shown. FIG. 13 is a sectional view of the door member. Note that, structural elements which have been described in the foregoing embodiments are also assigned the same reference numerals.

In the door member 16 shown in FIG. 7, the slits 26a of the hinge pieces 26 are formed non-parallel to the image line connecting the lower edge of the door member 16 with the upper edge thereof so as to secure the door member 16 on the shafts 24a and 24b. But in the case that there is no possibility of detaching the door member 16 from the shafts 24a and 24b, the slits 26a may be formed parallel to the image line connecting the lower edge of the door member 16 with the upper edge thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk player, comprising:

a casing having an opening section, through which a disk cartridge is inserted and taken out, in a front face;

a door member being pivotably attached to said casing, said door member rotatable outside of said casing between a first position, at which said door member closes the opening section of said casing, and a second position, at which said door member opens the opening section of said casing, wherein a lower section of said door member is pivotably attached to a lower section of the opening section of said casing;

means for biasing said door member toward the first position;

at least one rib disposed on a rear face of said door member; and an ejecting mechanism for moving the disk cartridge from a set position toward the door member such that when said ejecting mechanism is actuated a disk cartridge pushes said at least one rib so that the door member is opened outward and the disk cartridge can be removed from the casing;

said door member including an extended section which is extended upward and outward from an upper edge of said door member, wherein the door member is movable to open the opening section of the casing by engaging a front end of a disk cartridge with the extended section of the door member, and by pushing the extended section downward with the disk cartridge, such that the door member is opened, the disk cartridge is inserted, and the door member is closed.

2. A disk player, comprising:

a casing having an opening section, through which a disk cartridge is inserted and taken out, in a front face;

a door member being pivotably attached to said casing, said door member rotatable outside of said casing between a first position, at which said door member closes the opening section of said casing, and a second position, at which said door member opens the opening section of said casing, wherein an upper section of said door member is pivotably attached to an upper section of the opening section of said casing;

means for biasing said door member toward the first position;

at least one rib disposed on a rear face of said door member; and an ejecting mechanism for moving the disk cartridge from a set position toward the door member such that when said ejecting mechanism is actuated a disk cartridge pushes said at least one rib so that the door member is opened outward and the disk cartridge can be removed from the casing;

said door member including an extended section which is extended downward and outward from a lower edge of said door member, wherein the door member is movable to open the opening section of the casing by engaging a front end of a disk cartridge with the extended section of the door member, and by pushing the extended section upward with the disk cartridge, such that the door member is opened, the disk cartridge is inserted and the door member is closed.

\* \* \* \* \*